Sept. 15, 1925.
J. W. PARKER
MICROMETER CALIPER
Filed June 20, 1924
1,553,875
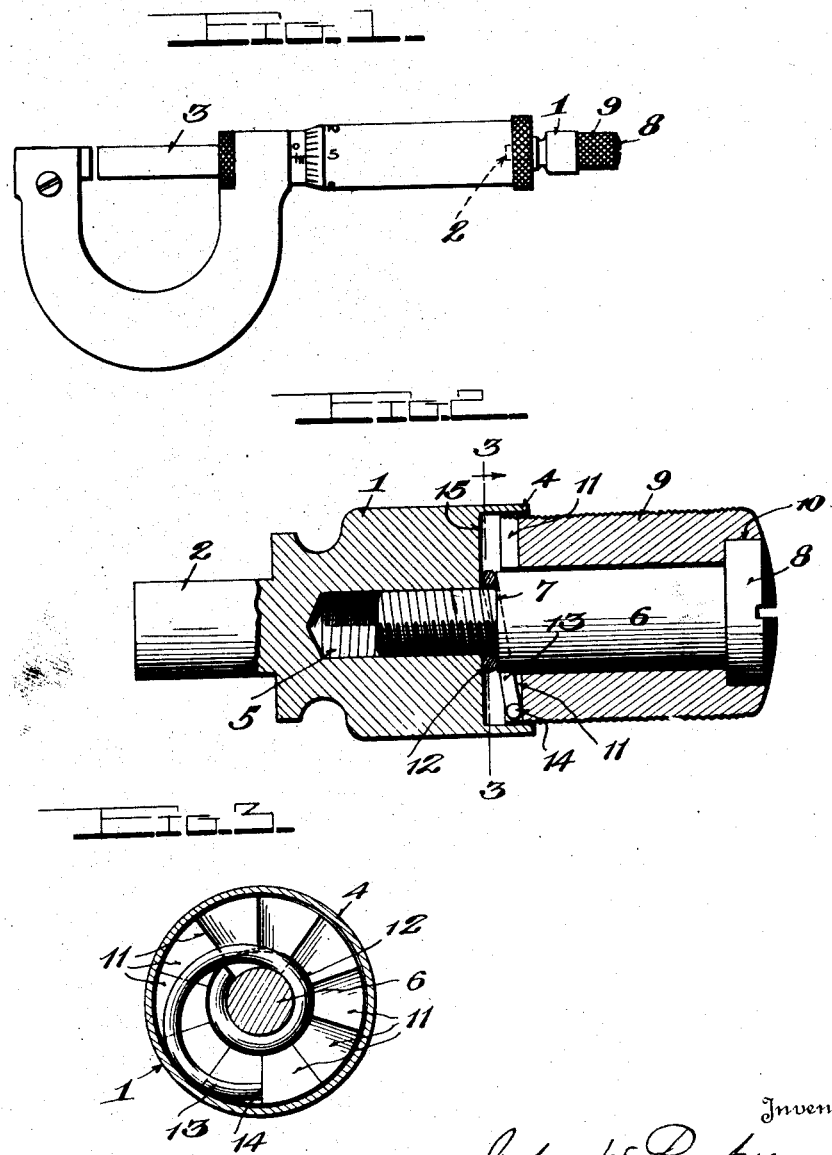

Patented Sept. 15, 1925.

1,553,875

UNITED STATES PATENT OFFICE.

JOHN W. PARKER, OF BARRINGTON, RHODE ISLAND, ASSIGNOR TO BROWN & SHARPE MANUFACTURING COMPANY, OF PROVIDENCE, RHODE ISLAND.

MICROMETER CALIPER.

Application filed June 20, 1924. Serial No. 721,336.

*To all whom it may concern:*

Be it known that I, JOHN W. PARKER, a citizen of the United States, residing at Barrington, in the county of Barrington and State of Rhode Island, have invented new and useful Improvements in Micrometer Calipers, of which the following is a specification.

This invention relates to certain new and useful Improvements in micrometer calipers and pertains more particularly to a ratchet for enabling sensitive control of the feed of the micrometer screw so as to insure absolute accuracy of measurement.

The primary object of the invention is to provide a ratchet structure of maximum simplicity involving a minimum of parts which can be easily and quickly applied to the micrometer screw so as to reduce the cost of production to a relatively marked degree.

A further object of the invention is to provide a ratchet structure which is extremely sensitive so as to freely idle upon a certain degree of pressure being exceeded, and which at the same time is not likely to get out of order.

The invention further aims to provide a ratchet structure which requires no modification of the micrometer barrel in being applied to the micrometer screw.

The invention has still further and other objects which will be later set forth and manifested in the course of the following description.

In the drawings:—

Figure 1 is a side elevation of the invention applied to calipers;

Figure 2, is an enlarged side elevation partly in section of the invention detached from the calipers, and Figure 3 is a section on line 3—3 of Figure 2.

In proceeding in accordance with the present invention a cylindrical body 1 is employed, which is formed with an attaching shank 2 at its inner end, the latter being received in an opening provided therefor in the outer end of the micrometer screw 3, a driving or frictional fit being provided to secure the shank to the screw. The outer end of the body 1 is formed with a rim 4 providing a cup-like part. The body is formed with an axial screw threaded hole 5 extending through its outer end and in which is received a screw 6 shouldered at 7 and having a head 8 on its outer end. The ratchet includes a sleeve-like member indicated at 9 which has a knurled periphery.

The ratchet sleeve is received over the screw 6 and has a counterbored part 10 in which the head 8 of the screw is received, and at its inner end is formed with radially extending ratchet teeth 11. The pawl is formed of a piece of spring wire or other suitable material and has an inner coil or eye 12 at one end and has its other end curved at 13, the end edge 14 of the curved part 13 being formed to engage the ratchet teeth 11. The coil or eye 12 of the spring pawl snugly engages about the reduced threaded end of the fastening screw 6 and is abutted or held by and between the outer end wall of the body 1 and the shoulder 7 of the screw 6 so as to be rigidly clamped against movement. The curved arm 13 is offset with relation to the wall 15 of the body so as to have free movement toward and away from the wall as the ratchet teeth 11 move over the pawl. The coil or eye 12 further serves to properly or sufficiently space the wall and ratchet to permit of the aforementioned free movement of the curved end of the pawl.

From the foregoing it will be noted that the attachment may be applied by merely boring a hole to receive the stud or shank 2, in the end of the micrometer screw.

The device extends outwardly from an end of the micrometer screw and in no way interferes with or affects the barrel of the screw.

Having thus described my invention, what I claim as new and desire to secure by Letters Patent is:—

1. In combination with the screw of a micrometer caliper having a hole in the end thereof, an attachment including a body having a stud on one end received in said hole and having a cup-like part on its opposite end, said body having a screw hole extending through its outer end, a screw in said threaded hole having a shoulder, a knurled sleeve on the second screw having ratchet teeth on its inner end, and having said inner end extending into the cup-like part, and a spring wire pawl having an eye on one end received over the second screw and clamped between the shoulder and the outer end wall of the body the pawl having a curved free end part the end edge of which is engaged with the ratchet teeth.

2. In combination with the screw of a micrometer caliper, a body, means to secure the body to the screw, said body having a cup shaped outer end, a screw secured to the body and having a shoulder thereon, a sleeve on the screw having ratchet teeth on one end extending into the cup, and a spring pawl impinged at one end between the bottom wall of the cup and the shoulder and having its opposite end free and formed to engage the ratchet teeth.

3. In combination with the screw of a micrometer caliper, a body, means to connect the body to the screw, a spring pawl having one end thereof engaged with a part of the body, a screw having a shouldered part engaged with said end of the pawl to clamp same against said part of the body, and a rotatable member on the second screw having ratchet teeth, the other end of the pawl being free and offset and formed to engage the ratchet teeth.

4. In combination with the screw of a micrometer caliper, a body, means to connect the body to the screw, a spring pawl having one end thereof engaged with a part of the body, means to clamp said end of the spring pawl against said part of the body, and a rotatable device on said last named means having ratchet teeth, the other end of the pawl being free and formed to engage the ratchet teeth.

In testimony whereof I have signed my name to this specification.

JOHN W. PARKER.